W. L. WHITE.
FOOD DISPENSING APPARATUS.
APPLICATION FILED MAR. 24, 1919.

1,330,104.   Patented Feb. 10, 1920.

Inventor:
William L. White,
by his attorney,
Charles S. Gooding.

UNITED STATES PATENT OFFICE.

WILLIAM L. WHITE, OF OLD ORCHARD, MAINE.

FOOD-DISPENSING APPARATUS.

1,330,104.  Specification of Letters Patent.  Patented Feb. 10, 1920.

Application filed March 24, 1919. Serial No. 284,812.

*To all whom it may concern:*

Be it known that I, WILLIAM L. WHITE, a citizen of the United States, residing at Old Orchard, in the county of York and State of Maine, have invented new and useful Improvements in Food-Dispensing Apparatus, of which the following is a specification.

This invention relates to an improved food dispensing apparatus for restaurants and is especially adapted to restaurants known as self-service restaurants. In using my improved food dispensing apparatus a show case is provided containing food and the customer orders food contained in said show case, said show case being located on a counter and preferably having a transparent top and front side, the rear side being open.

In this show case is located the different articles of food on sale, the customer standing at one side of said show case, the attendant on the opposite side, and the customer orders such articles of food as he may desire from the collection of food contained in the show case. The attendant picks out the articles ordered by the customer, placing such articles on a tray and then, placing the tray on the top of the show case, pushes it across the top of the show case to the customer. In order to prevent scratching or otherwise injuring the top surface of the show case so as to practically spoil it, both as to looks and as to transparency, and also to render the entire upper surface of the show case serviceable without waste of space, parallel guide members are placed on top of the show case and are suitably connected therewith and these guide members are preferably connected by rods extending longitudinally of the show case.

The trays are particularly constructed, as hereinafter described, to be placed upon these guide members and guided by them across the show case. The guide members serve a double purpose. First, they prevent the trays from contacting with the upper surface of the top of the show case. Second, they locate a plurality of trays side by side without any space being wasted on the top of the show case and without any possibility of the trays interfering one with the other.

The invention consists in the combination and arrangement of parts set forth in the following specification and particularly pointed out in the claims.

Referring to the drawings.

Like numerals refer to like parts throughout the several views of the drawings.

Figure 1:
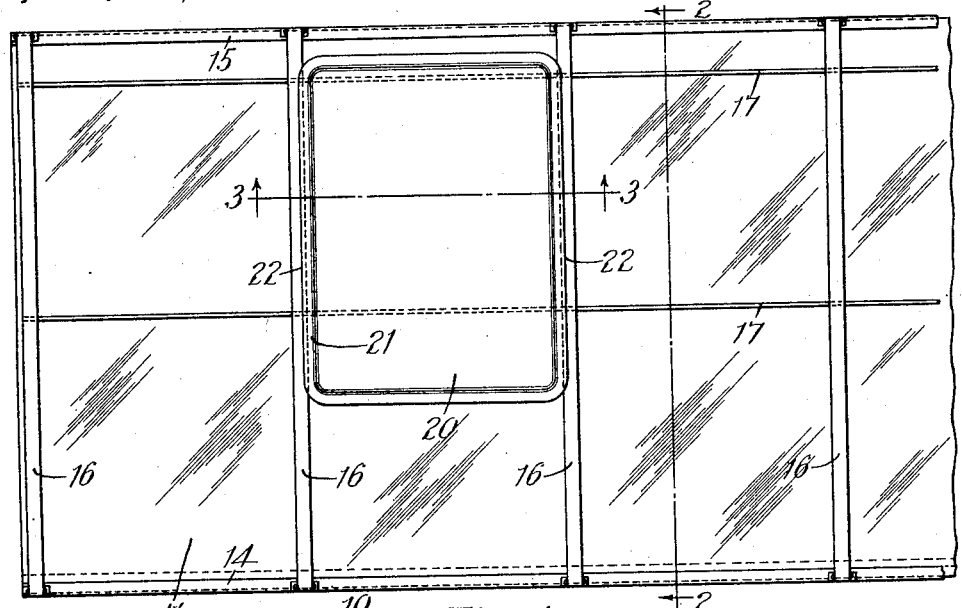
Figure 1 is a plan view of a portion of a show case with my improved food dispensing apparatus attached thereto.
Figure 2:
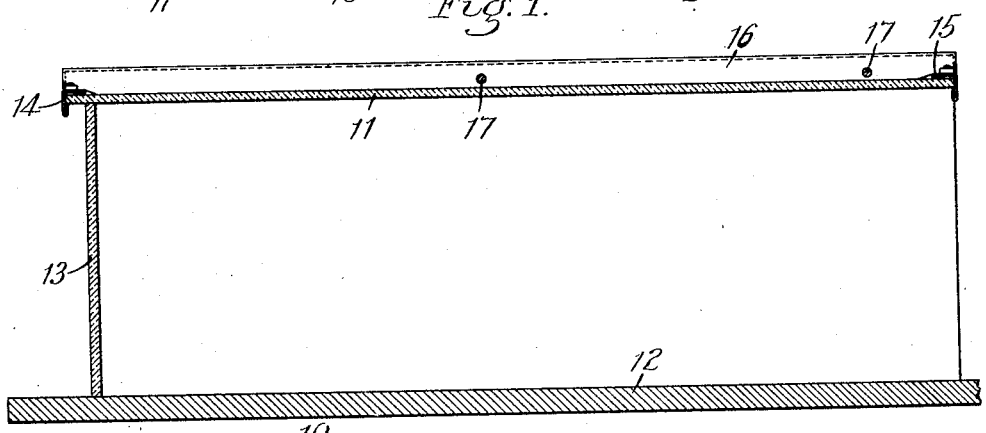
Fig. 2 is an enlarged transverse sectional elevation taken on line 2—2 of Fig. 1.

In the drawings, referring to Figs. 1, 2 and 3, 10 is a portion of a show case having a top member 11, a bottom 12 and a front side 13. The top member 11 and the side 13 are preferably formed of glass. The rear side of the show case is preferably left open, as shown in Fig. 2.

Along the opposite longitudinal edges of the top member 11 extend angle bars 14 and 15 and to these angle bars are fastened a plurality of parallel guide members 16. A plurality of rods 17, forming guard members, extend longitudinally of the show case and through holes provided therefor in the lower portions of the guide members 16. The guide members 16 are preferably formed of sheet metal and the opposite sides 18 and 19 thereof converge downwardly.

Figure 3:
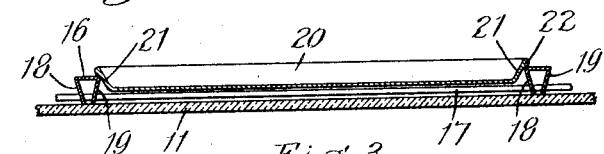
Fig. 3 is an enlarged transverse section taken on line 3—3 of Fig. 1.

A tray 20 is provided which has inclined sides 21, preferably terminating at their upper edges in a bead 22, and when the tray is in position it rests, as shown in Fig. 3, with the inclined sides resting against the upper edges of two adjacent guide members 16. The guard members 17 extend beneath the tray when so positioned. The bead 22 assists in firmly positioning the tray with relation to the guide members 19 and also with relation to the top member 11 of the show case.

In use, the customer orders such articles as he desires from the attendant and said attendant selects the articles so ordered from the show case and places them on one of the trays 20. He then places the tray 20 on the guide members 16, as show in Fig. 3, and pushes the tray with the food thereon across the counter or show case to the customer, who then removes it from the show case and proceeds to a table.

If, in placing the tray upon the guide members, the attendant is careless and does not get the tray on perfectly straight, so that one corner is apt to tip down and strike the glass, it will be prevented from so doing by the longitudinally extending guard members 17, two of which are shown in the drawing. As many of these guard members, however, as may be necessary can be supplied so as to fully protect the upper surface of the show case from injury of any kind by the tray.

Figure 4:
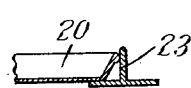
Fig. 4 is a transverse section of a modified form of guide member with a portion of a tray shown in connection therewith.

In Fig. 4 a modified form of guide member is shown consisting of an angle bar 23 and a portion of a tray 20 is shown in connection therewith. The bottom of the tray in this instance rests upon the bottom flange of the guide member 23, while the upper edge of the tray rests against the vertical flange of said guide member 23.

Figure 5:
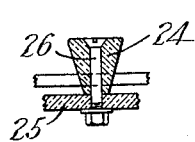
Fig. 5 is a transverse section of another form of guide member.

In Fig. 5 a modified form of guide member is shown which may be of any desired material, but preferably of glass, and consists of the guide member 24 which is shown as fastened to the top of the show case by bolts 26.

Figure 6:
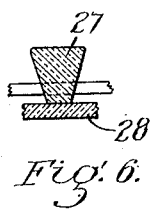
Fig. 6 is a transverse section of still another form of guide member.

In Fig. 6 another modified form of guide member 27 is illustrated which may be of glass and may be integral with the top 28 of the show case, if so desired, or may be cemented thereto.

In the last two forms of guide member illustrated in Figs. 5 and 6, it will be understood that the guide members may be fastened directly to the top of the show case either by cement or by fusing the same thereto.

Having thus described my invention, what I claim and desire by Letters Patent to secure is:

1. A food dispensing apparatus for restaurants having, in combination, a top member, a plurality of parallel guide members extending transversely of said top member and adapted to support and guide a tray, and means extending transversely of said guide members and supported thereby adapted to prevent said tray from contacting with said top member.

2. A food dispensing apparatus for restaurants having, in combination, a top member, a plurality of parallel guide members extending transversely of said top member and adapted to support and guide a tray and a guard member extending longitudinally of said top member, connecting said guide members together and adapted to prevent a tray from contacting with said top member.

3. A food dispensing apparatus for restaurants having, in combination, a top member, a pair of angle bars extending along the opposite longitudinal edges of said top member and a plurality of guide members extending transversely of said top member and fastened to said angle bars, said angle bars preventing displacement of said guide members.

4. A food dispensing apparatus for restaurants having, in combination, a top member, a pair of angle bars extending along the opposite longitudinal edges of said top member, a plurality of guide members extending transversely of said top member and fastened to said bars and adapted to support and guide a tray and a plurality of rods extending longitudinally of said top member and engaging said guide members.

5. A food dispensing apparatus for restaurants having, in combination, a top member, parallel guide members extending transversely of said top member, each of said guide members having oppositely disposed sides converging downwardly and a tray having oppositely disposed inclined sides adapted to engage the upper edges of an adjacent pair of said guide members.

In testimony whereof I have hereunto set my hand in presence of two subscribing witnesses.

WILLIAM L. WHITE.

Witnesses:
　FRANKLIN E. LOW,
　CHARLES S. GOODING.